United States Patent [11] 3,620,291

| [72] | Inventor | Marcel Joseph Charles Delachapelle Aillant-sur-Tholon (Yonne), France |
|---|---|---|
| [21] | Appl. No. | 878,083 |
| [22] | Filed | Nov. 19, 1969 |
| [45] | Patented | Nov. 16, 1971 |
| [32] | Priority | Nov. 19, 1968 |
| [33] | | France |
| [31] | | 174,408 |

[54] PROCESS FOR ALUMINOTHERMAL WELDING
3 Claims, 13 Drawing Figs.

[52] U.S. Cl. .................................................. 164/108,
164/DIG. 12, 164/54, 164/12, 29/486, 164/366
[51] Int. Cl. ...................................................... B22d 19/00
[50] Field of Search ............................................ 164/DIG.
12, 108, 53, 364, 365, 368, 12, 54, 109, 110

[56] References Cited
UNITED STATES PATENTS

| 3,070,874 | 1/1963 | Davis, Jr. | 29/157 |
| 3,103,719 | 9/1963 | Bishop et al. | 164/DIG. 12 |
| 1,793,047 | 2/1931 | Brewitt | 164/54 X |

FOREIGN PATENTS

| 464,011 | 8/1928 | Germany | 164/54 |

Primary Examiner—J. Spencer Overholser
Assistant Examiner—V. Rising
Attorney—Browdy and Neimark ABSTRACT: The disclosure concerns a welding process utilizing apparatus comprising cores having certain of their faces with shapes corresponding to those of the end parts of the sections to be joined, housings which are fitted on the parts of the sections to be joined which extend outside the cores, a fusible cutoff element closing the exit from the cores, a rigid support fittable on the housings and a hearth capable of being maintained in stable position on the support. The process includes the step of forming a mold in situ by the ignition of a mixture of aluminothermal material and refractory material, and then adding a first fraction of molten material to the mold, after a period of time releasing the first fraction and adding a second fraction of molten material to the mold so as to weld the abutting ends of the sections to be joined.

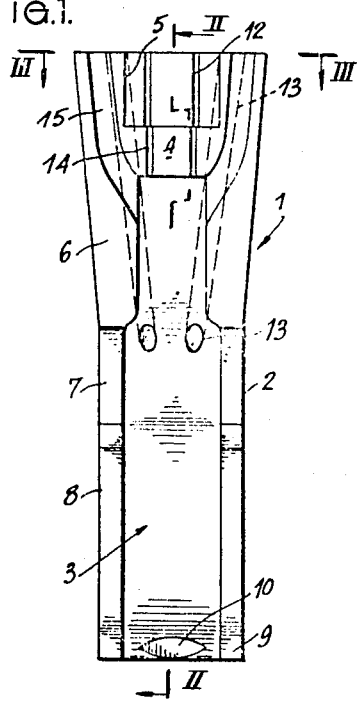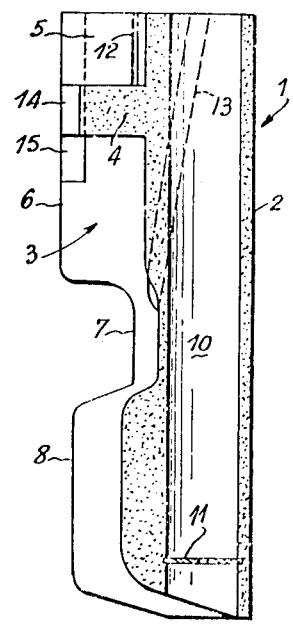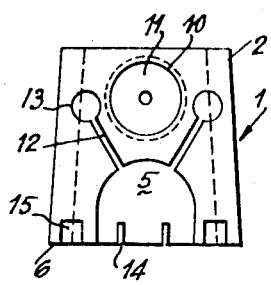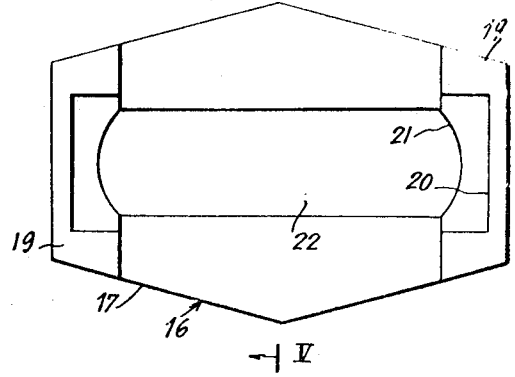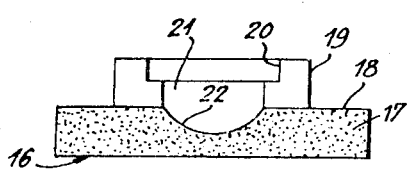

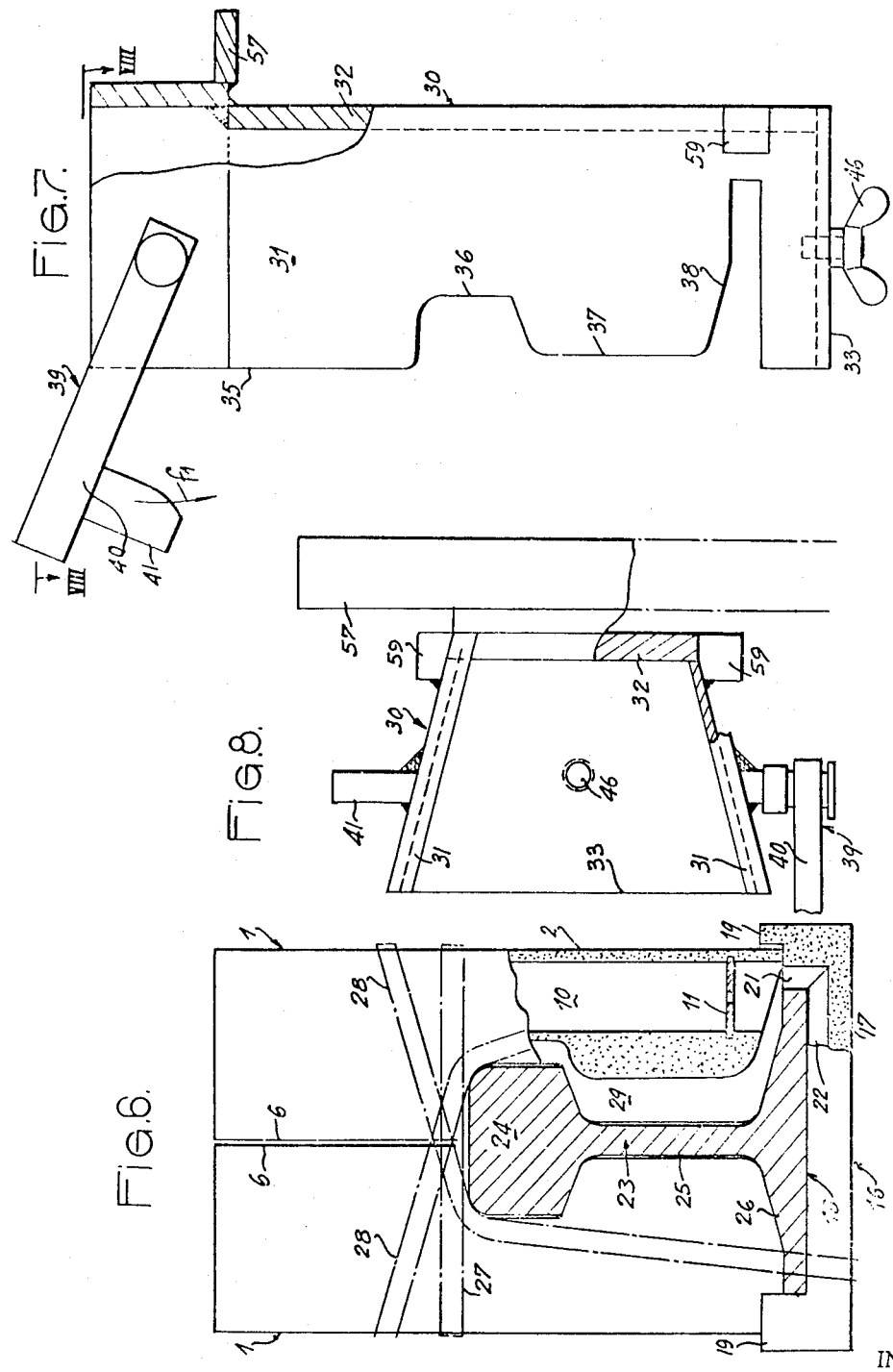

PROCESS FOR ALUMINOTHERMAL WELDING

This invention concerns aluminothermal welding of different sections such as the rails of train lines.

To carry out the welding of two different sections, the method is known of adapting, in the bounding area of these sections, special molds, a hearth containing an aluminothermal mixture as well as a preheating device most often constituted by a burner fed by an oxygen-propane mixture to assure first of all the baking of the molds, then the preheating of the ends of the sections to be joined. Such a process requires the additional presence of bottles of compressed gas, pressure gauges, pipes and fittings, burners, burner carriers and an important transport apparatus which makes it possible to effect the movement over the work sites necessarily horizontally of each welding to be carried out, particularly in the case of assembly rails for railroads.

To reduce the size of this apparatus, with the thought of facilitating transportation and reducing the resulting cost of each welding carried out, it has been suggested to fit the various molds on the terminal parts facing the sections in such a way that the flow of the aluminothermal mixture simultaneously guarantees a baking as well as a preheating of the ends of the sections. To obtain an effective preheating, it was thought necessary to increase in a certain proportion the flow of the molten aluminothermal mixture but experiments have shown that this process, on the one hand, brought about a great consumption of the aluminothermal mixture and, on the other hand, did not result in a perfectly homogenous welding.

The present invention remedies the drawbacks mentioned above by creating a novel process as well as a novel apparatus for its implementation which makes it possible to achieve aluminothermal welding of the ends of any two sections directly, simply and efficiently.

The process and the apparatus for its implementation are designed in such a way as to reduce the costs of operation and of stocking necessary in carrying out a welding, with the thought of facilitating their implementation even in isolated areas and/or a small number of weldings.

According to the process of the invention, the terminal parts of any two sections to be joined are enclosed by cores of complementary form around the mentioned sections. Housings are fitted on these sections which are meant to form a rigid envelope surrounding the different cores with which the said envelope defines a space which is filled with a mixture containing aluminothermal and refractory products in determined proportions. The mixture is ignited to assure the formation of a refractory coating forming a mold with the cores surrounding the sections at least in part. A molten metal obtained from an aluminothermal mixture is poured into the cores. For a certain time a first fraction of this molten metal is maintained inside the cores to effect a rise in temperature and a first fusion of the end parts of the sections. The first fraction of metal partly cooled is freed, which is replaced by a second fraction of molten metal assuring the welding of the end parts of the sections; then, after at least partial recooling, the housings constituting the envelope are removed to destroy the original mold so as to then subject the end parts brought together by welding to a trimming operation.

According to another characteristic of the invention, the apparatus for the implementation of the process comprises cores with certain of the faces presenting profiles complementary to that of the end parts of the sections to be joined, housings joinable on the parts of the sections extending on the outside of the cores, an element sealing at least the mouth of flow formed by the cores, a rigid support fittable on the housings and a hearth capable of being maintained in a stable position on the support.

Various other characteristics of the invention result moreover from the following detailed description.

A form of realization of the objects of the invention is represented, by way of a nonlimiting example, in the attached drawings, wherein:

FIG. 1 is an elevational view of one of the basic elements of the apparatus for the implementation of the process according to the invention;

FIG. 2 is a vertical cross-sectional view taken along the line II—II of FIG. 1;

FIG. 3 is a plan view taken following line III—III of FIG. 1;

FIG. 4 is a plan view of another basic element of the apparatus for the implementation of the process according to the invention;

FIG. 5 is a cross-sectional view taken along the line V—V of FIG. 4;

FIG. 6 is a vertical view, partly removed, showing the first phase of the implementation of the process;

FIG. 7 is an elevational view, partly removed, of another basic element of the apparatus for the implementation of the process according to the invention;

FIG. 8 is a plan view, partly removed, taken along the line VIII—VIII of FIG. 7;

Figure 9:
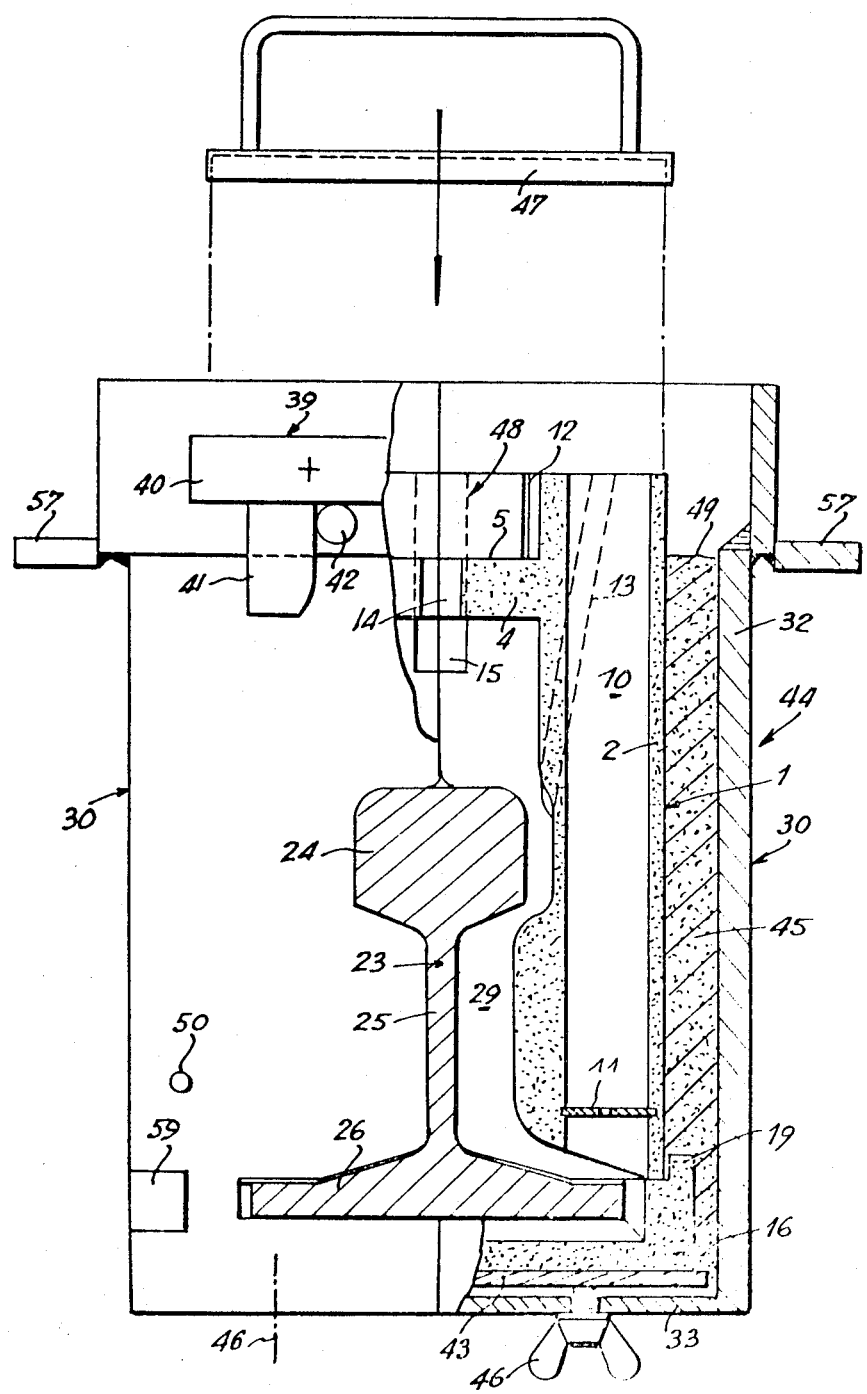
FIG. 9 is a half-elevational, half-sectional view, partly removed, illustrating the second phase of the implementation of the process.

To implement the process according to the invention, cores of sand or similar matter are used, which are clearly effected as a function of the particular form of the sections before being assembled. In the example involving the application of the process for the assembly by welding end to end of two rails, two cores, called laterals, are used principally as represented in FIGS. 1 through 3. According to these figures, each lateral core includes a body 2, markedly parallelepipedal of which one of the sides shows in dugout form a longitudinal recess 3 extending from one of the transverse sides up to a partition 4 separating the said recess from a cavity 5 emerging at the level of the second transverse face of body 2. The outline of the bottom of the recess 3 is chosen to follow the local contour defined by two sides 6 of the body 2 cut in a complementary way to the sections before being assembled. In the example illustrated, the sides 6 are effected to present at a certain distance from partition 4 a notch 7 complementary to the head of a railway rail. The notch 7 is elongated by a rectangular piece 8 extending as a recess of side 6 in a measurement equal to half the thickness of the web joining the head of the railway rail to the fixing flange of the rail for which a clearance 9 is provided from the rectangular piece 8 to the transverse face corresponding to body 2. The longitudinal recess 3 communicates at its lower part, that is, in a plane markedly above the clearance 9, with an evacuation pipe 10, of cylindrical cross section for example, cut off at its lower part by a metallic member 11 partly perforated, the particular function of which is brought out by the following. The evacuation pipe 10 emerges on the level of the second transverse face of the body 2 behind the cavity 5 which communicates by slots 12 with discharge openings 13 which slope to the outlet at their lower portion at the bottom of the recess 3 approximately at the level of the upper part of the notch 7. The cavity 5 also communicates directly with the recess 3 by slots 14 in the partition 4 into which open canals 15 extending concavely edgewise from sides 6.

To implement the process, a core 16 is also used as shown in FIGS. 4 and 5, called a bottom core, comprising a thick plate 17 of sand or similar matter of which one of its faces presents in its median side a grooving 18 of the length at least equal to the width of the flange of the rail. The presence of the grooving 18 permits two lateral bosses 19 to remain on the plate 17 which extend according to the coordinates equal one to the other and proceeding from the face of the plate 17 presenting concavely the grooving 18. Two notches 20 are in the bosses 19 which are markedly rectangular, the length of which is at least slightly greater than the width of the bodies 2 taken between the exterior lateral faces forming the rectangular pieces 8. Open canals 21 are set from the bottom of notches 20 to make the latter communicate with a trench 22 installed in the grooving 18 extending between the bosses 19.

The first phase of implementation of the process of the invention to assure the assembly end to end of two rails 23, one of which is represented in cross section in FIG. 6, consists in adapting on the ends facing the said rails 23 two lateral cores 1 which are respectively housed by notch 7, the rectangular piece 8 and the clearance 9 to join as close as possible the lateral profile corresponding to the head of railway rail 24 of the web 25 of flange 26. The lateral cores 1 are maintained in the required position according to a common transverse plane by one or several ties 27 of any suitable nature which permits the reduction to their least value of the spaces between the sides 6. The implementation and the maintenance of cores 1 are completed by the adaption of the bottom core 16 which is placed on the rail 23 in such a way to effect the maximal engagement of flange 26 in grooving 18 and, simultaneously the relative penetration of the low terminal parts of the lateral cores 1 in their respective notches 20. The maintenance of the bottom core 16 is then assured by the installation of two ties 28, which may be similar to ties 27, placed as represented in FIG. 6 to avoid any risk of the transverse dislocation of core 16.

The assembly of cores 1 and 16, as described above, makes it possible to form all around the terminal parts opposite the rails 23 a peripheral space 29 constituted by the recesses 3, the open canals 21 and the trench 22. The space 29 is almost closed about all its periphery by the different sides of the lateral cores 1 and by the bottom core 16 kept in contact with the faces opposite the extremities end to end of the rails 23.

To implement the second phase of the process according to the invention, frames or housings 30 are used respectively, constructed as represented in FIGS. 7 and 8. Each housing 30 is formed by two lateral plates 31, a transverse plate 32 and a bottom 33 assembled to from the housing of which the section and the height are greater than those of the assembly of cores 1 and 16. The free vertical sides 35 of the lateral plates 31 are cut to present a profile complementary to the one of the rails 23, including, in this example, a notch 36 capable of housing the head 24 of the rail and tied by a rectangular piece 37 to a throat 38 provided for the flange 26. To this effect, the piece 37 is displaced in relationship to side 35 a distance corresponding to half the thickness of the web 25 of the rail. The lateral plates 31 are moreover equipped at their upper part with bolting means 39, for example comprising for one of the wings, a pivoting lever 40 extended by a transverse finger 41 and, for the second wing, a lug or stud 42.

To implement the second phase of the process as it is represented in FIG. 9, one of the housings 30 is adapted to cover one of the lateral cores 1 and the part corresponding to the bottom core 16. The centering of the vertical and transverse planes of the housing 30 is guaranteed by the notch 36, the rectangular piece 37 and by the throat 38 which house the parts corresponding to the rails 23 extending beyond the assembled lateral cores 1. Between core 16 and bottom 33 of the housing 30 a supporting metal tie plate 43 is installed, the plane form of which corresponds to that of the bottom core 16. The second housing 30 is then fitted in a similar way to form an envelope 44 with the first housing 30 thereby completely surrounding the various cores 1 and 16 which the housings 30 and centered to enclose, between their interior faces and the periphery of the assembled cores, an annular space 45. The maintenance of the housings 30 in their respective positions, is guaranteed by the bolting means 39. To this effect, the levers 40 are pivoted in the direction of the arrow $f_1$ so as to make the transverse fingers 41 pass behind the lugs 42. The section of the transverse fingers 41 is chosen as is represented in FIGS. 7 and 9 so that the complete pivoting of levers 40 makes it possible to assure the tightening of housings 30 in relationship to the parts of the rails 23 extending beyond the various assembled cores. This lateral tightening is then completed by a vertical tightening caused by screws 46 placed across the bottoms 33 to suitably tighten the tie plate 43 under the bottom core 16, against the lower face of flange 26.

After the assembly of the housings 30, as described above, at the upper part of the lateral cores 1 is placed a cover 47 designed to totally cut off the evacuation pipes 10 as well as the overflow pipe 48 formed by the cavities 5. Then the annular space 45 is filled by a mixture 49 of suitable aluminothermal and refractory products of small granulometry, the proportions of which can vary according to the particular applications foreseen. The load of mixture 49 filling the annular space 45 is then ignited by any suitable means, such as by means of rods introduced at the base of the space 45 through holes 50 provided for this use in the walls of the housings 30. The great heat put out by the oxidation of the aluminothermal products brings about the reduction of the refractory products which are thus melted and become associated with certain of the components of the aluminothermal products to constitute together a homogeneous refractory material with a compact structure surrounding the lateral cores 1 as well as the peripheral contour of cores 16. The formation around the various cores of a casing of refractory material is provided to form a leakproof mold with the cores, suitably surrounding the end parts of the sections to be joined, onto which the various cores are strongly applied by heat shrinkage exercised by the refractory encasement maintained by the envelope 44. The formation of the encasement of refractory material has moreover as an effect the baking of the various cores as well as the reactive preheating of the end parts of the sections before being assembled by welding.

Figure 10:
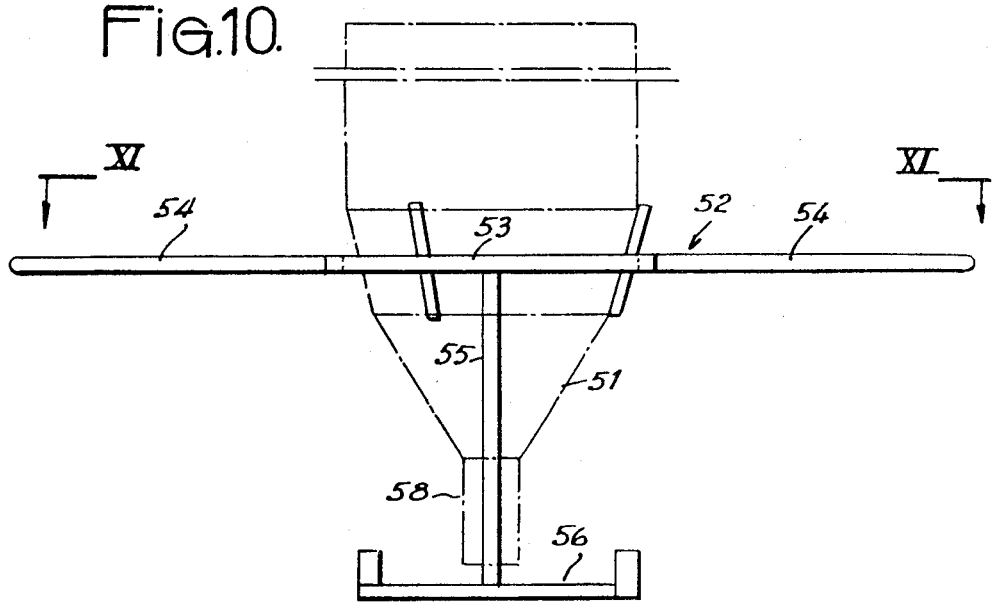
FIG. 10 is an elevational view, on a smaller scale, of another basic element of the apparatus for the implementation of the process.
Figure 11:
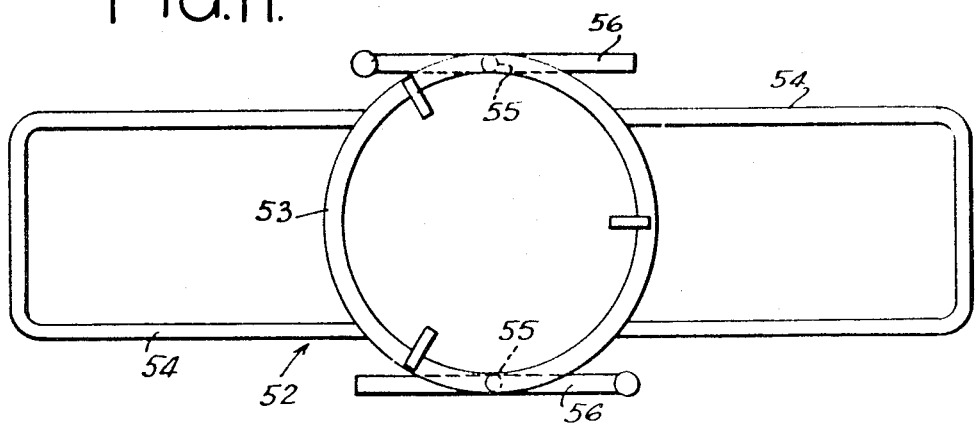
FIG. 11 is a plan view taken along the line XI—XI of FIG. 10.
Figure 12:
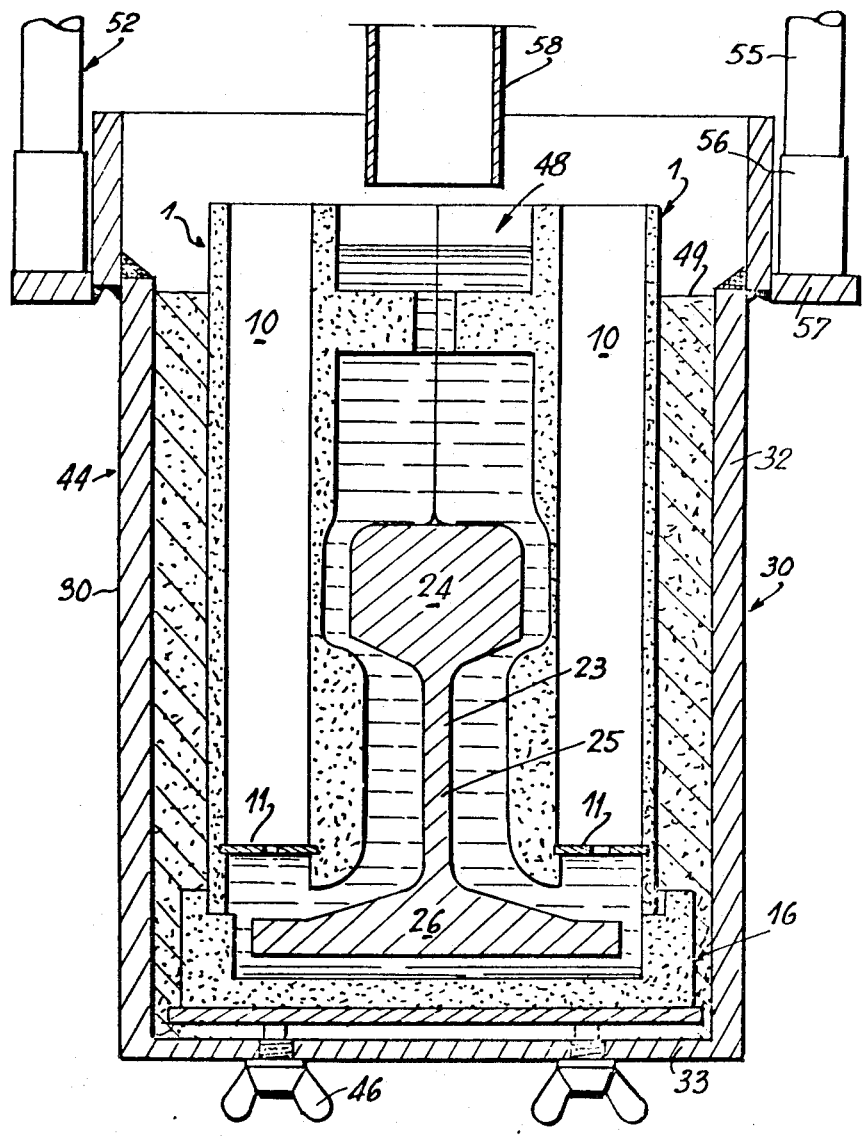
FIGS. 12 and 13 are vertical-sectional views illustrating two particular phases of the process according to the invention.
Figure 13:
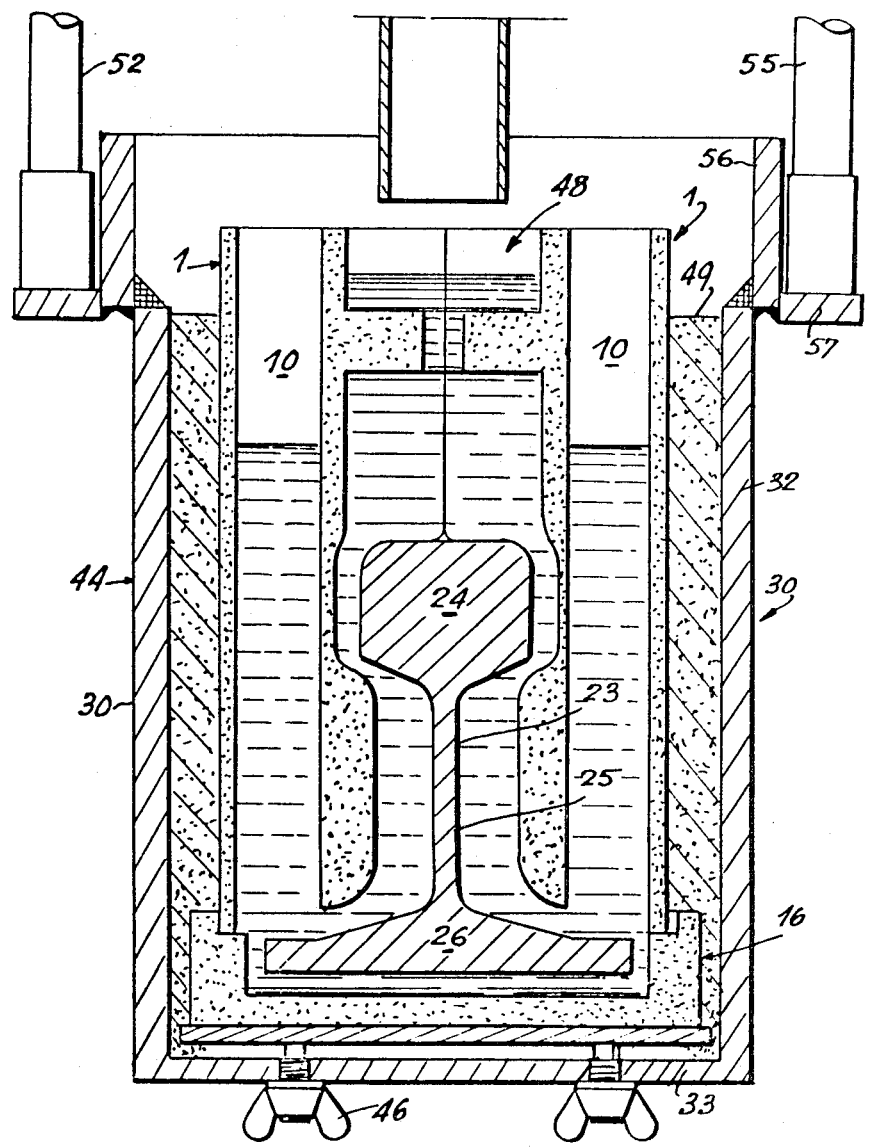

After formation of the refractory encasement 49, the cover 47 is removed so as to install a hearth 51 as represented by dots and dashes (FIG. 10) on a support 52. The support 52 includes a centering holder 53 which is extended outwardly in the same plane to form two handle grips 54 for conveyance and handling. The holder 53 is equipped with two feet 55 extended by flanges 56 which are supported on brackets 57 extending outwardly from the transverse inner walls 32 of the housings 30. The shape of the support 52 is such that its installation on brackets 57 results in the exit nozzle 58 of the hearth 51 being directly above the overflow pipe 48. In this position, the hearth 51 is filled with a load of aluminothermal material the composition of which is determined by the nature of the basic material of the sections to be joined.

Another phase of the process consists in igniting the load of the aluminothermal material contained in hearth 51 to bring about fusion of the applied metal which is fed by the nozzle 58 into the pipe 48. The molten metal flows through slots 12 and 14 to enter the space 29 which is progressively filled by completely surrounding the ends opposite the rails 23. In effect, the molten metal first follows the longitudinal recesses 3 to totally fill the trench 22 then the open canals 21 before partially being raised into the interior of the evacuation pipes which are cut off by the metallic members 11. The characteristics of the latter are initially determined in order to present a certain resistance to the fusion at the contact of the cast metal in such a way as to allow a complete filling of space 29 and to maintain the cast metal for a certain time in contact with the end parts of the rails 23, in order to effect a rise in temperature sufficient to initiate an initial fusion for the purpose of effecting a welding in the heart of the said opposing terminal ends. The resistance of the metallic members 11 to the fusion is short lived, so that they then free the passage section of the evacuation pipes 10 to receive the partly cooled fraction of the molten metal surrounding the ends of the rails 23 which is forced by the continual arrival of the molten metal fed by the nozzle 58 from the hearth 51. In all cases, the resistance of the metallic members 11 is determined in order that their fusion occurs well before the complete filling of the overflow pipe 48 in such a way that the molten metal, coming from the nozzle 58, flows entirely into the housing 29 through the slots 12 and 14. The second fraction of molten metal introduced into the housing 29 totally forces out the partially cooled first fraction and makes it possible, by the additional heat which it brings, to effect a second fusion of the opposing end parts of the rails 23 which are thus progressively assembled by welding in an exactly parallel plane which makes it possible to obtain a completely homogeneous bonding which is entirely brought about when the load of aluminothermal product contained in the hearth 51 is completely drained.

After sufficient cooling, the screws 46 are loosened, then the bolting levers are disengaged in order to free the housings 30 which can be easily removed with relation to the rails 23 by means of levers engaged between the flange 26 and the abutments 59 installed for this reason on the lateral faces of the housings 30. After removal of the housings 30, the refractory encasement 49 and the various cores are destroyed to totally disengage the assembled end parts of the rails 23, which are then subjected to a trimming operation to totally eliminate the cores and fins formed after cooling by the metal contained in the housing 29 and in the evacuation pipes 10.

As is seen from the preceding, the apparatus for implementation of the process is particularly simple and not cumbersome, which makes it possible, on the one hand, to considerably simplify the installation operations at the time of a welding and, on the other hand, to markedly diminish the cumbersomeness and the weight of the apparatus to be transported. Furthermore, the presence of metallic members 11 with different fusion, makes it possible to maintain an initial fraction of molten metal in contact with the end parts to be joined, which results in bringing about first of all a correct rise in the temperature of the end parts, and then the execution of an initial welding completed afterwards by the second fraction of uncooled molten metal. It becomes possible to effect by aluminothermal material a perfect welding requiring only a small load of aluminothermal material as compared to the amount consumed by the prior art methods, thus assuring the rise in temperature of the end parts to be joined by that important discharge of molten metal.

The process, according to the invention, makes it possible to also assure an extremely rapid and effective rise in temperature following the reactive preheating initiated by the reaction of the aluminothermal mixture used in the formation of the refractory encasement, which notably reduces the time necessary for the performance of a welding of the end parts of two sections. It should be noted that the realization of the refractory encasement in the space 29 presents additionally the advantage of making the cores impervious in relationship to the sections, which contributes to the reduction of the time of performance of a welding and of the requirement for the supplementary material normally used for this purpose.

The invention is not limited to the example of performance, represented and described in detail, because various modifications can be added to it without leaving its framework. In particular, according to the form of sections to be joined, the cores and housing can be designed in a manner different from the one indicated in the preceding.

What is claimed is:

1. A process of aluminothermal welding of sections which are to be joined together comprising enclosing the end parts of the sections to be joined by cores of a shape which are complementary to the shape of said sections and which forms a first space between said cores and said end parts of said sections, fitting housings over said cores to from a rigid envelope about said sections with an annular space surrounding said cores, filling said annular space with a mixture of aluminothermal and refractory products in determined proportions, and igniting said mixture to form a refractory encasement about said cores thereby forming a mold enclosing the ends of the sections to be joined.

2. A process according to claim 1 further comprising admitting a first fraction of a molten metal obtained from an aluminothermal mixture into said mold for a period of time to effect a rise in temperature and an initial welding of the sections to be joined, discharging said first fraction of partly cooled molten metal, replacing it by a second fraction of molten metal for completing the welding of the end parts of the sections to be joined, then after partial cooling removing the housings and destroying said mold.

3. A process according to claim 2 wherein said initial fraction of molten metal is discharged from the mold by the use of a fusible cutoff which fuses after a given period of time due to the heat generated to permit the discharge of said first fraction of molten metal.

* * * * *